United States Patent
Edara et al.

(10) Patent No.: US 9,228,315 B2
(45) Date of Patent: Jan. 5, 2016

(54) SYSTEM AND METHOD FOR MODIFYING A PATH FOR A MACHINE

(71) Applicant: Caterpillar Inc., Peoria, IL (US)

(72) Inventors: Thandava K. Edara, Peoria, IL (US); Michael Taylor, Swissvale, PA (US); Timothy Felty, East Peoria, IL (US); Mo Wei, Dunlap, IL (US); Kenneth L. Stratton, Dunlap, IL (US); Jean-Jacques Clar, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 463 days.

(21) Appl. No.: 13/722,445

(22) Filed: Dec. 20, 2012

(65) Prior Publication Data

US 2014/0180444 A1    Jun. 26, 2014

(51) Int. Cl.
| | |
|---|---|
| *E02F 3/00* | (2006.01) |
| *E02F 3/84* | (2006.01) |
| *G05D 1/00* | (2006.01) |
| *E02F 9/20* | (2006.01) |
| *G05D 1/02* | (2006.01) |

(52) U.S. Cl.
CPC .............. *E02F 3/841* (2013.01); *E02F 9/2045* (2013.01); *G05D 1/00* (2013.01); *G05D 1/0088* (2013.01); *G05D 1/0278* (2013.01); *G05D 2201/0202* (2013.01)

(58) Field of Classification Search
None
See application file for complete search history.

(56) References Cited

U.S. PATENT DOCUMENTS

| | | | | |
|---|---|---|---|---|
| 4,273,196 | A | * | 6/1981 | Etsusaki et al. ................ 172/4.5 |
| 4,807,131 | A | * | 2/1989 | Clegg ............................... 701/50 |
| 4,926,948 | A | | 5/1990 | Davidson et al. |
| 4,986,384 | A | * | 1/1991 | Okamoto et al. ............. 180/167 |
| 5,375,663 | A | * | 12/1994 | Teach .............................. 172/4.5 |
| 5,462,122 | A | | 10/1995 | Yamamoto et al. |
| 5,631,658 | A | * | 5/1997 | Gudat et al. .................... 342/457 |
| 5,875,854 | A | | 3/1999 | Yamamoto et al. |
| 5,984,018 | A | | 11/1999 | Yamamoto et al. |
| 6,076,030 | A | | 6/2000 | Rowe |
| 6,152,238 | A | * | 11/2000 | Ferrell et al. ....................... 172/2 |
| 6,181,999 | B1 | | 1/2001 | Yamamoto et al. |
| 6,223,110 | B1 | | 4/2001 | Rowe et al. |
| 6,236,924 | B1 | * | 5/2001 | Motz et al. ....................... 701/50 |
| 6,246,932 | B1 | * | 6/2001 | Kageyama et al. ............. 701/24 |
| 6,363,632 | B1 | * | 4/2002 | Stentz et al. ..................... 37/414 |
| 6,421,627 | B1 | | 7/2002 | Ericsson |
| 6,655,465 | B2 | | 12/2003 | Carlson et al. |
| 6,845,311 | B1 | | 1/2005 | Stratton et al. |
| 6,988,591 | B2 | * | 1/2006 | Uranaka et al. ................ 187/247 |
| 7,676,967 | B2 | | 3/2010 | Gharsalli et al. |
| 8,031,629 | B2 | | 10/2011 | Stegmaier et al. |

(Continued)

FOREIGN PATENT DOCUMENTS

WO    WO 2008/118027 A2    10/2008

*Primary Examiner* — Darrin Dunn
*Assistant Examiner* — Christopher E Everett
(74) *Attorney, Agent, or Firm* — Leydig, Voit & Mayer, Ltd.

(57) ABSTRACT

A system for modifying a path of operation of a machine includes a position sensor and a controller. The controller stores the path of operation, receives a plurality of position signals as the work implement moves material along the path of operation, and determines the position of the work surface. The controller further determines an amount of material moved based at least in part upon the position of the work surface and modifies parameters used to determine a subsequent path of operation if the amount of material moved exceeds a predetermined amount.

11 Claims, 9 Drawing Sheets

(56) References Cited

U.S. PATENT DOCUMENTS

| | | | |
|---|---|---|---|
| 8,726,543 B2 * | 5/2014 | Kelly | 37/412 |
| 2002/0143461 A1 * | 10/2002 | Burns et al. | 701/117 |
| 2002/0162668 A1 | 11/2002 | Carlson et al. | |
| 2004/0168358 A1 | 9/2004 | Stump | |
| 2006/0069472 A1 * | 3/2006 | Makela | 701/23 |
| 2006/0149465 A1 * | 7/2006 | Park et al. | 701/209 |
| 2007/0044980 A1 | 3/2007 | Stratton et al. | |
| 2007/0299590 A1 * | 12/2007 | Shull et al. | 701/50 |
| 2009/0216410 A1 * | 8/2009 | Allen et al. | 701/50 |
| 2010/0076640 A1 * | 3/2010 | Maekawa et al. | 701/26 |
| 2010/0131122 A1 * | 5/2010 | Dersjo et al. | 701/2 |
| 2010/0299031 A1 | 11/2010 | Zhdanov et al. | |
| 2012/0136508 A1 * | 5/2012 | Taylor et al. | 701/2 |
| 2012/0136524 A1 * | 5/2012 | Everett et al. | 701/24 |

* cited by examiner

SYSTEM AND METHOD FOR MODIFYING A PATH FOR A MACHINE

TECHNICAL FIELD

This disclosure relates generally to controlling a machine, and more particularly, to a system and method for automated adjustment of parameters used to plan a path of operation of the machine.

BACKGROUND

Machines such as dozers, motor graders, wheel loaders, etc., are used to perform a variety of tasks. For example, these machines may be used to move material and/or alter work surfaces at a work site. The machines may operate in an autonomous or semi-autonomous manner to perform these tasks in response to commands generated as part of a work plan for the machines. The machines may receive instructions in accordance with the work plan to perform operations such as digging, loosening, carrying, etc., different materials at the work site.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

Movements of the machines and their associated work implements are often developed by a planning system or module. A plurality of variables may affect the planning system and impact the efficiency of the machine operation. It is often desirable to ensure that the machines perform the material movement operations such that the materials are moved in an efficient manner. In some instances, various desired operating parameters or characteristics may be set within the planning system. For example, parameters of a slot being used to move material such as its shape, depth, and angle may be set within the planning system. However, parameters that are desirable at one stage of the material moving process may not be desirable at other stages. Accordingly, it may be desirable to alter some of the parameters during the material moving process to improve the efficiency of the machines.

PCT Patent Publication No. WO 2008/0118027 discloses a method of contour shaping by a machine equipped with a cutting implement. The method includes providing a desired topographical plan, measuring the real time position of at least one of the machine and the cutting implement, generating instructions to move the cutting implement, plotting a transitional path from the real time position of the machine or the cutting implement to a point on the desired topographical plan, and using the transitional path and the real time position of the machine or the cutting implement to generate the instructions to move the cutting implement.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for modifying a path of operation of a machine having a ground engaging work implement includes a position sensor associated with the machine for generating position signals indicative of a position of the work surface and a controller. The controller is configured to store the path of operation, receive a plurality of position signals from the position sensor as the work implement moves material along the path of operation, and determine the position of the work surface based upon the plurality of position signals. The controller is further configured to determine an amount of material moved along the path based at least in part upon the position of the work surface and modify the path of operation if the amount of material moved exceeds a predetermined amount.

In another aspect, a method for modifying a path of operation of a machine includes storing the path of operation, receiving a plurality of position signals from a position sensor indicative of a position of a work surface as a work implement of the machine moves material along the path of operation, and determining the position of the work surface based upon the plurality of position signals. The method further includes determining an amount of material moved along the path based at least in part upon the position of the work surface and modifying the path of operation if the amount of material moved exceeds a predetermined amount.

In still another aspect, a machine includes a prime mover, a ground engaging work implement for engaging a work surface, and a position sensor for generating position signals indicative of a position of the work surface. A controller is configured to store the path of operation, receive a plurality of position signals from the position sensor as the work implement moves material along the path, and determine the position of the work surface based upon the plurality of position signals. The controller is further configured to determine an amount of material moved along the path of operation based at least in part upon the position of the work surface and modify the path of operation if the amount of material moved exceeds a predetermined amount.

DETAILED DESCRIPTION

Figure 1:
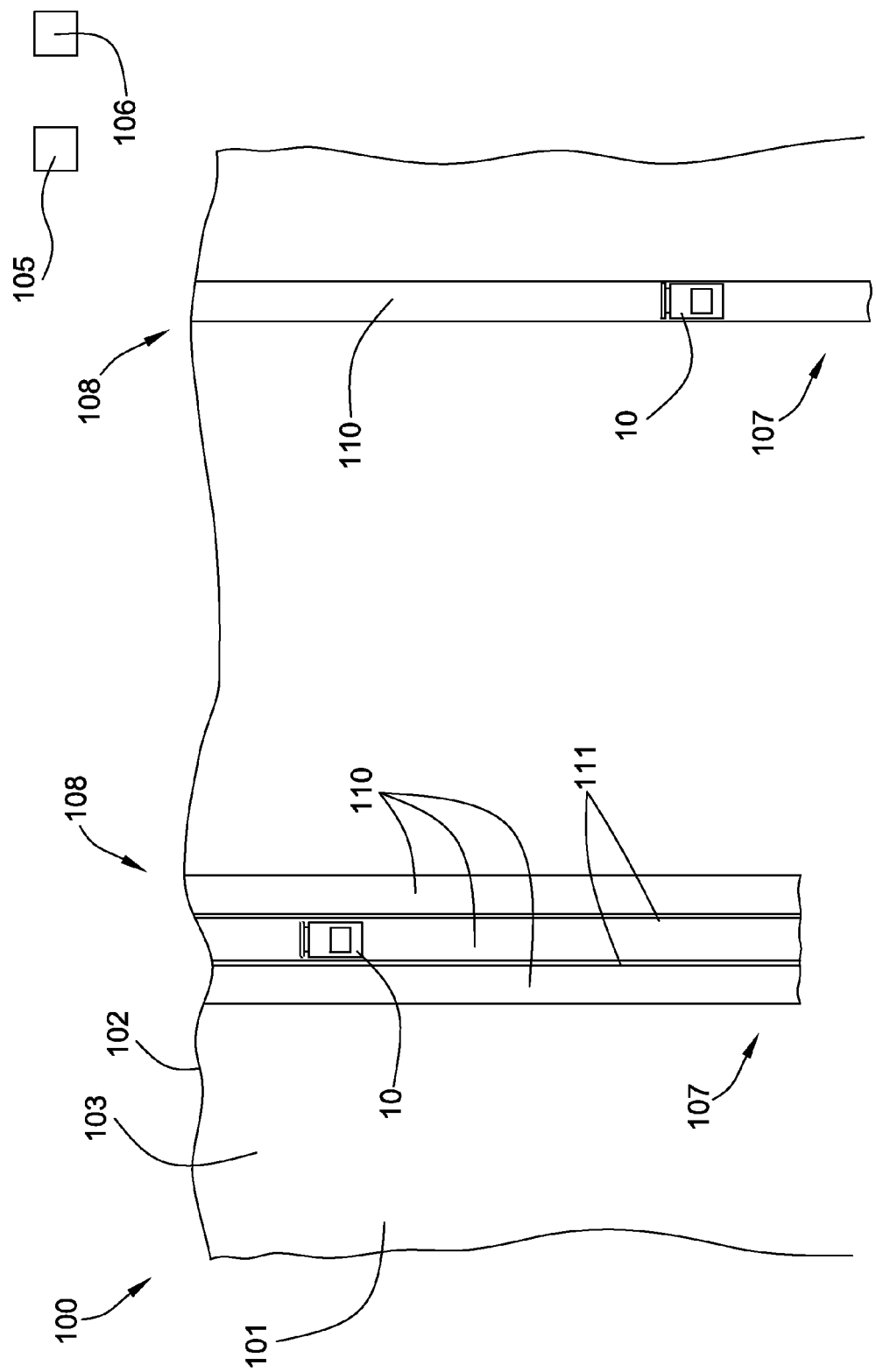
FIG. 1 shows a schematic view of a work site at which a machine incorporating the principles disclosed herein may be used.

FIG. 1 depicts a diagrammatic illustration of a work site 100 at which one or more machines 10 may operate in an autonomous, a semi-autonomous, or manual manner. Work site 100 may be a portion of a mining site, a landfill, a quarry, a construction site, or any other area in which movement of material is desired. Tasks associated with moving material may include a dozing operation, grading operation, a leveling operation, a bulk material removal operation, or any other type of operation that results in alteration of the current topography at work site 100. As depicted, work site 100 includes a work area 101 having a crest 102 defining an edge of a ridge, embankment, high wall or other change in elevation. Work surface 103 may take any form and refers to the actual profile or position of the terrain of the work area.

As used herein, a machine 10 operating in an autonomous manner operates automatically based upon information received from various sensors without the need for human operator input. As an example, a haul truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
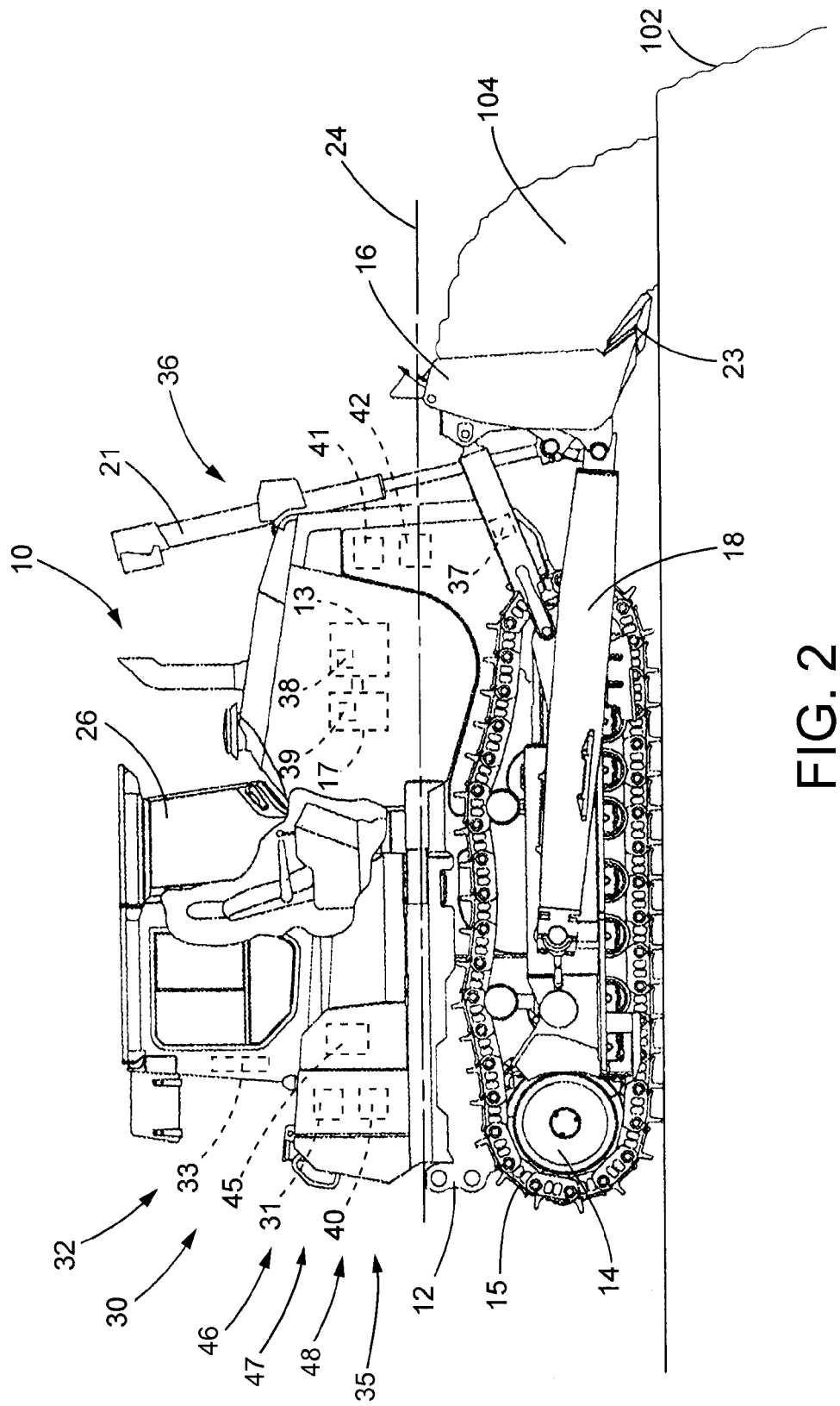
FIG. 2 shows a diagrammatic illustration of a machine in accordance with the disclosure.

FIG. 2 shows a diagrammatic illustration of a machine 10 such as a dozer adjacent crest 102 with a work implement or a blade 16 pushing material 104 over the crest. The machine 10 includes a frame 12 and a prime mover such as an engine 13. A ground-engaging drive mechanism such as a track 15 is driven by a drive wheel 14 on each side of machine 10 to propel the machine 10. Although machine 10 is shown in a "track-type" configuration, other configurations, such as a wheeled configuration, may be used. Operation of the engine 13 and a transmission (not shown) which are operatively connected to the drive wheels 14 and tracks 15 may be controlled by a control system 30 including a controller 31. Other types of prime movers and drive systems are contemplated.

Machine 10 may include a ground engaging work implement such as blade 16 pivotally connected to frame 12 by arms 18 on each side of machine 10. First hydraulic cylinder 21 coupled to frame 12 supports blade 16 in the vertical direction, and allows blade 16 to move up or down vertically from the point of view of FIG. 2. Second hydraulic cylinders 22 on each side of machine 10 allow the pitch angle of blade tip 23 to change relative to a centerline 24 of the machine.

Machine 10 may be equipped with a plurality of sensors that provide data indicative (directly or indirectly) of various operating parameters of the machine. A hydraulic system may include sensors for monitoring pressure within the system as well as the pressure of specific cylinders. For example, one or both of the second hydraulic cylinders 22 may include an associated pressure sensor 37. Sensors may be provided to monitor the operating conditions of the engine 13 and the associated drivetrain such as an engine speed sensor 38 and a torque converter speed sensor 39. The machine may also include an accelerometer 40 for determining the acceleration of the machine along various axes. Still further, a pitch angle sensor 41 and a pitch rate sensor 42 may be included for determining roll, pitch and yaw of machine 10. Other sensors necessary or desirable for operating the machine 10 may be provided.

Machine 10 may be controlled by a control system 30 that interacts with a positioning system such as a global positioning system ("GPS") to monitor and/or control the movement of the machine about the work site 100. The control system 30 may be located on the machine 10 and/or may be located at a command center 105 (FIG. 1) located remotely from the machine. In certain embodiments, the functionality of control system 30 may be distributed so that certain functions are performed at machine 10 and other functions are performed at command center 105. For example, a network system such as wireless network system 106 (FIG. 1) may provide generalized commands or information to the machine 10 that the portions of control system 30 on the machine utilize to generate specific commands to operate the various systems of machine 10. In the alternative, aspects of the control system 30 remote from the machine 10 may provide some or all of the specific commands that are then transmitted by the wireless network system 106 to systems of the machine. Machine 10 may be one of several machines operating at work site 100, each of which may communicate with the wireless network system 106.

Rather than operating the machine 10 in an autonomous manner, an operator may have the ability to operate the machine 10 remotely such as with a wireless control unit 45. Still further, machine 10 may also include a cab 26 that an operator may physically occupy and provide input to control the machine. Cab 26 may include one or more input devices through which the operator issues commands to control the propulsion and steering of the machine as well as operate various implements associated with the machine. In one embodiment, machine 10 may be configured to be operated autonomously, semi-autonomously, or manually. In case of semi-autonomous or manual operation, the machine may be operated by remote control and/or by an operator physically located within the cab 26.

The control system 30, as shown generally by an arrow in FIG. 2 indicating association with the machine 10, may include an electronic control module or controller 31. The controller 31 may receive input command signals from the wireless network system 106, remote control input command signals from an operator operating machine 10 remotely, or operator input command signals from an operator operating the machine 10 from within cab 26. The controller 31 may control the operation of the drivetrain as well as the hydraulic systems that operate the ground engaging work implement such as blade 16. The control system 30 may include one or more sensors to provide data and other input signals representative of various operating parameters of the machine 10. The term "sensor" is meant to be used in its broadest sense to include one or more sensors and related components that may be associated with the machine 10 and that may cooperate to sense various functions, operations, and operating characteristics of the machine.

The controller 31 may be an electronic controller that operates in a logical fashion to perform operations, execute control algorithms, store and retrieve data and other desired operations. The controller 31 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry.

The controller 31 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 31 may be implemented in hardware and/or software without regard to the functionality. The controller 31 may rely on one or more data maps relating to the operating conditions of the machine 10 that may be stored in the memory of controller. Each of these data maps may include a collection of data in the form of tables, graphs, and/or equations.

A position sensing system 32, as shown generally by an arrow in FIG. 2 indicating association with the machine 10, may include a position sensor 33 to sense a position of the machine relative to the work area 101. The position sensor 33 may include a plurality of individual sensors that cooperate to provide signals to controller 31 to indicate the position of the machine 10. The controller 31 may determine the position of the machine 10 within work area 101 as well as the orientation of the machine such as its heading, pitch and roll. In doing so, the dimensions of the machine 10 may be stored within the controller 31 with the position sensing system defining a datum or reference point on the machine and the controller using the dimensions to determine the position of the terrain or work surface 103 upon which the machine is moving. Such position sensor 33 may be a series of GPS sensors, an odometer or other wheel rotation sensing sensor, a perception based system or may use other systems such as lasers to determine the position of machine 10.

Machine 10 may be configured to move material at the work site 100 according to one or more material movement plans from an initial location 107 to a spread or dump location 108. The dump location 108 may be at crest 102 or at any other location. The material movement plans may include, among other things, forming a plurality of spaced apart channels or slots 110 that are cut into the work surface at work site 100 along a path from the initial location 107 to the dump location 108. In doing so, each machine 10 may move back and forth along a linear path between the initial location 107 and the dump location 108. If desired, a relatively small amount of material may be left or built up as walls 111 between adjacent slots 110 to prevent or reduce spillage and increase the efficiency of the material moving process. The walls 111 between the slots 110 may be moved after the slots are formed or periodically as desired. The process of moving material through slots 110 while utilizing walls 111 of material to increase the efficiency of the process is sometime referred to as "slot dozing."

Figure 3:
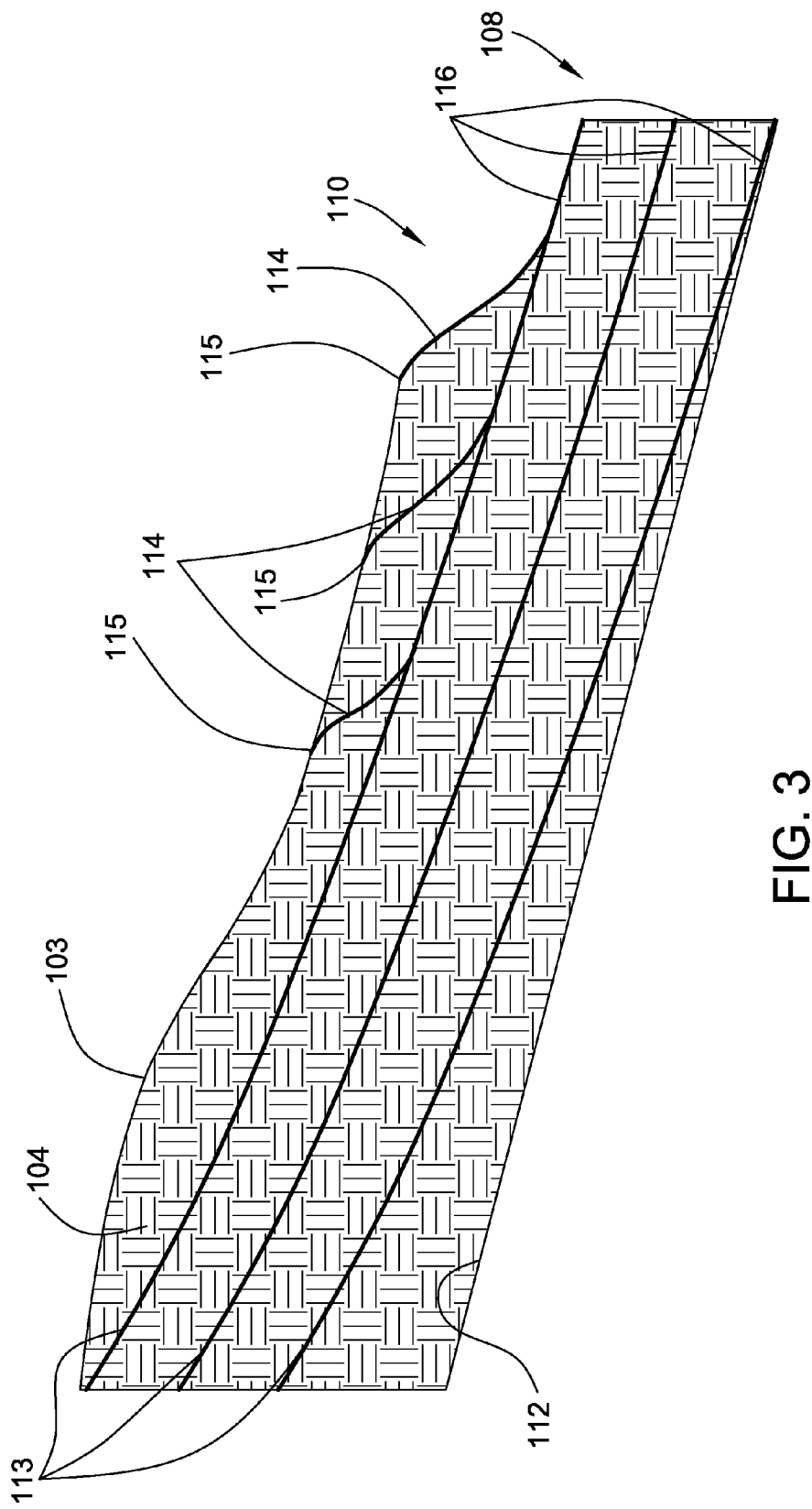
FIG. 3 shows a cross-section of a portion of a work site depicting various aspects of a material moving plan.

As depicted in FIG. 3, in one embodiment, each slot 110 may be formed by initially setting the desired parameters of the final work surface or final design plane 112. Material may be removed from the work surface 103 in one or more layers or passes 113 until the final design plane 112 is reached. The blade 16 of machine 10 may engage the work surface 103 with a series of cuts 114 that are spaced apart lengthwise along the slot 110. Each cut 114 begins at a cut location 115 along the work surface 103 at which the blade 16 initially engages the work surface and extends into the material 104 towards the pass target or carry surface 116 for a particular pass. Controller 31 may be configured to guide the blade 16 along each cut 114 until reaching the carry surface 116 and then follow the carry surface towards the dump location 108.

Figure 4:
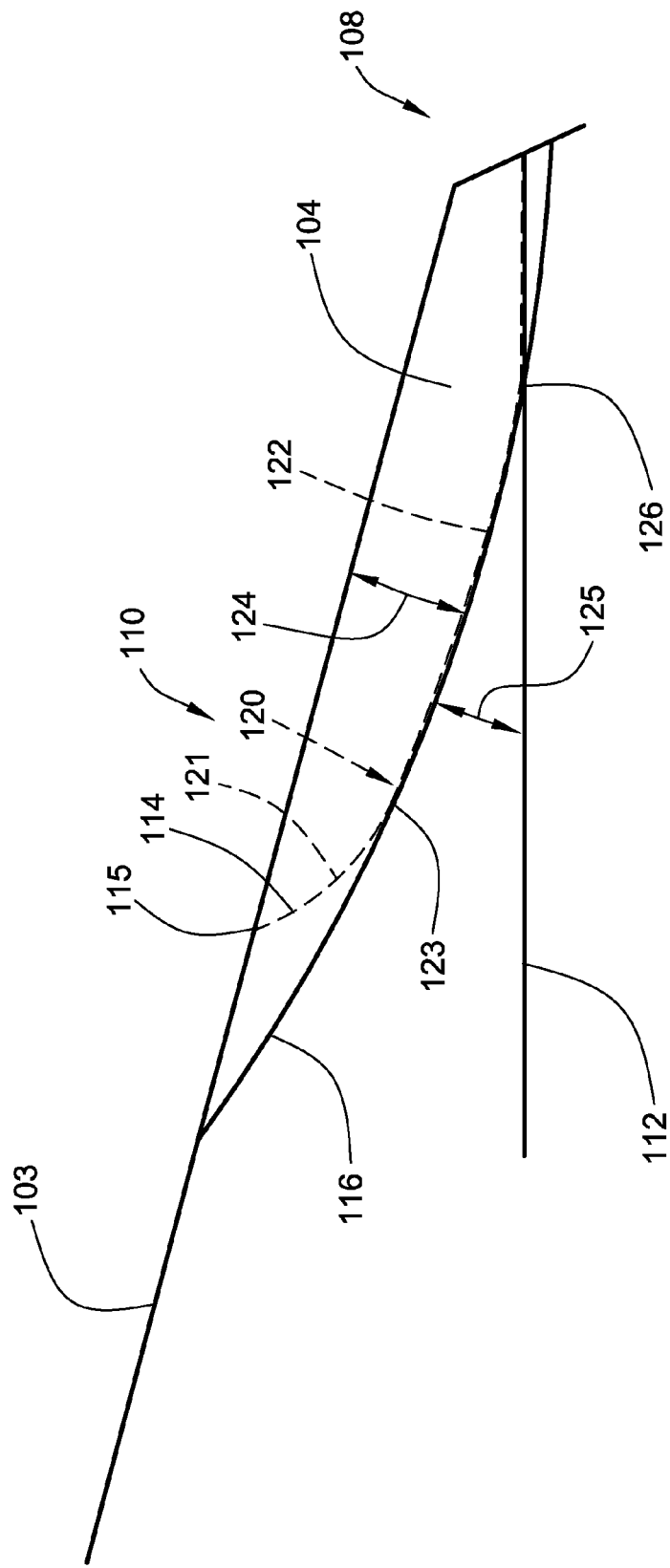
FIG. 4 shows a diagrammatic cross-section of a portion of a work site depicting a potential target profile.

During each material moving pass, the controller 31 may be configured to guide the blade 16 generally along a desired path of operation or target profile depicted by dashed line 120 in FIG. 4 from the cut location 115 to the dump location 108. A first portion 121 of the target profile 120 extends from the cut location 115 to the carry surface 116. The first portion 121 may be referred to as the loading profile as that is the portion of the target profile 120 at which the blade 16 is loaded with material. A second portion 122 of the target profile 120 extends from the intersection 123 of the cut 114 and the carry surface 116 to the dump location 108. The second portion 122 may be referred to as the carry profile as that is the portion of the target profile 120 at which the blade 16 carries the load along the carry surface 116.

The first portion 121 or loading profile may have any configuration and, depending on various factors including the configuration of the work surface 103 and the type of material to be moved, some cut profiles may be more efficient than others. The loading profile may be formed of one or more segments that are equal or unequal in length and with each having different or identical shapes. These shapes may be linear, symmetrically or asymmetrically curved, Gaussian-shaped or any other desired shape. In addition, the angle of any of the shapes relative to the work surface 103 or the final design plane 112 may change from segment to segment.

The second portion 122 or carry profile may have any configuration but is often generally linear and sloped downward so that movement of material will be assisted by gravity to increase the efficiency of the material moving process. In other words, the carry profile is often configured so that it slopes downward towards the dump location 108. The carry profile (sometimes referred to as the slot parameters) may define the shape of the carry surface 116, the depth of the carry surface 116 below an uppermost surface of the work surface 103 as indicated by reference number 124, and the angle of the carry surface as indicated by reference number 125. In some instances, the angle 125 of the carry surface may be defined relative to a gravity reference or relative to the final design plane 112.

Although it may be generally desirable for the blade 16 to follow the target profile 120, performance characteristics of the machine 10 and/or desired operating efficiencies may cause a deviation from the target profile 120. More specifically, as blade 16 makes a cut 114, the load on the blade will increase. Further, as the blade 16 travels along the carry surface 116, the load on the blade will likely continue to increase. If the blade 16 is overloaded for a particular slope, the machine 10 may slip and/or cause excess wear on the machine. Accordingly, the control system 30 may include a blade control system 46 to maximize the efficiency of the material moving process.

In one embodiment, the blade control system 46 may control the load on the blade 16 so that the torque generated by the machine 10 is generally maintained at or about a predetermined value. In one example, it may be desirable to maintain the load on the machine 10 at approximately 80% of its maximum torque. In other examples, it may be desirable to maintain the load at a range of approximately 70-90% of the maximum torque. Other values and ranges are contemplated. In order to maintain the load at a desired value or within a desired range, the blade control system 46 may raise or lower the blade 16 to decrease or increase the amount of material carried by the blade 16 and thus decrease or increase the load. It should be noted that since the work surface 103 may be at different angles relative to a gravity reference, the load on the blade 16 corresponding to a particular load (e.g. 80% of the maximum machine load) will likely vary depending on the slope at which the machine 10 is operating.

The control system 30 may include an implement load monitoring system 35 shown generally by an arrow in FIG. 2. The implement load monitoring system 35 may include a variety of different types of implement load sensors depicted generally by an arrow in FIG. 2 as an implement load sensor system 36 to measure the load on the blade 16. In one embodiment, the implement load sensor system 36 may embody one or more pressure sensors 37 for use with one or more hydraulic cylinder, such as second hydraulic cylinders 22, associated with blade 16. Signals from the pressure sensor 37 indicative of the pressure within the second hydraulic cylinders 22 may be monitored by controller 31. The load on the blade 16 may be correlated to the load on the engine 13 by controller 31. Other manners of determining a change in cylinder pressure associated with a change in the load on blade 16 are contemplated, including other manners of measuring the pressure within second hydraulic cylinders 22 and measuring the pressure within other cylinders associated with the blade.

The load on the blade 16 may be affected by the slope of the terrain upon which the machine 10 is moving. Accordingly, if desired, the accuracy of the implement load measurement may be increased by utilizing the implement load sensor system 36 in conjunction with a slope or inclination sensor such as pitch angle sensor 41. For example, if the machine 10 is moving uphill, the load on the blade 16 may be higher due to gravity as compared to a machine operating in the same conditions on flat terrain. Similarly, the load on the blade 16 may be lower for the same conditions when operating the machine in a downhill orientation. By determining the slope of the terrain, the controller 31 may more accurately determine changes in the load on the blade 16.

If desired, a machine load monitoring system 47 may be included in control system 30. The machine load monitoring system 47 may utilize the engine speed sensor 38 and the torque converter speed sensor 39 to measure a difference between the speed of the engine 13 and the torque converter 17 to determine the load on the machine 10.

Control system 30 may also include a module or planning system 48 for determining or planning various aspects of the excavation plan. The planning system 48 may receive various types of input such as the configuration of the work surface 103, the final design plane 112, the cut location 115, a desired loading profile, a desired carry profile, and characteristics of the material to be moved. Operating characteristics and capabilities of the machine 10 such as maximum load may also be entered into the planning system 48. The planning system 48 may simulate the results of cutting at a particular cut location and for a particular target profile, and then choose a cut location that creates the most desirable results based on one or more criteria.

In one example, the planning system 48 may calculate a volume of material that will be moved by the blade 16 as it travels along a first target profile corresponding to a first cut location 115. Based on the calculated volume of material that will be moved, the planning system 48 may modify the cut location 115 to define a second target profile. The planning system 48 may then calculate a volume of material to be moved based upon the second target profile. This process may be iteratively repeated until the planning system 48 selects an acceptable cut location that meets some predetermined criteria. After the planning system 48 selects an acceptable cut location 115, the cut location and its corresponding target profile may be utilized to guide the machine and the blade 16 and move material along the path to the dump location 108.

In one embodiment, the planning system 48 may be part of the controller 31 and perform while operating the machine 10. In another embodiment, the calculations may be performed ahead of time and the various inputs to the planning system 48 and the resultant cut locations 115 and target profiles 120 stored as part of the data maps of the controller 31. In such case, upon setting the desired inputs and determining the configuration of the work surface 103, an acceptable cut location 115 and corresponding target profile 120 may be determined by the controller 31 through the use of its data maps.

FIG. 4 is an illustration of a potential cut 114 at work site 100 that may be generated by control system 30. Work surface 103 represents the uppermost height of the existing material at the slot 110. While the illustration is depicted in two dimensions, it should be appreciated that the data representing the illustration may be in three dimensions. For example, the data representing work surface 103 may include a plurality of data points that represent the uppermost height of existing material at a plurality of locations along work surface 103. This information may be obtained according to any method known in the art. In one example, the machine 10 may utilize the position sensing system 32 described above to map out the contour of work surface 103 as machine 10 moves across it. This data may also be obtained according to other methods such as by a vehicle that includes lasers and/or cameras. It should be noted that as the machine 10 moves material to the dump location 108, the position of the work surface 103 may be updated based upon the current position of the machine 10 and the position of the blade 16.

The loading profile begins at cut location 115 on work surface 103 and ends at carry surface 116. As depicted in FIG. 4, the loading profile may be generally arcuate with a generally symmetrical curve. The carry surface 116 may be generally arcuate and curved downward to utilize gravity in an advantageous manner. It should be noted that the carry surface 116 is depicted as passing below the final design plane 112. In such case, the controller 31 may be configured to guide the blade 16 so that it does not pass below the final design plane 112. In other words, the target profile 120 defined by the planning system 48 may direct the blade 16 to move along the cut 114 while loading the blade, to move along the carry surface 116 beginning at the intersection 123 of the cut 114 and the carry surface 116 until reaching the intersection 126 of the carry surface 116 and the final design plane 112 and then move along the final design plane until reaching the dump location 108. This path is depicted by a dashed line in FIG. 4.

As may be seen in FIG. 4, moving the blade 16 along the target profile 120 will result in a volume of material 104 being moved from slot 110. The planning system 48 may use the shape of the loading profile and the cut location 115 to determine the volume of material that would be moved by blade 16 if the machine 10 were to follow the target profile 120. More specifically, the planning system 48 may use three-dimensional data that is used to represent the machine 10, the work surface 103, and the target profile 120 to make a volumetric calculation of the volume of material that will be moved for a particular target profile 120.

The planning system 48 may also be used to automatically adjust or modify parameters used to determine a subsequent path of operation or target profile 120 along which the machine 10 is intended to travel. This may be useful when machine 10 is operating autonomously or semi-autonomously. In one example, as material is moved over the crest 102, the sloped area adjacent the crest may eventually be filled in. As a result, the surface area or work surface 103 upon which the machine 10 may travel may eventually be extended. In another example, the target profile 120 may be set so that the material 104 is moved a predetermined distance to initially fill in relatively a rough and undulating work surface 103. As material 104 is moved, the carry surface 116 may become smoother and additional material may be moved to smooth out addition surfaces of the work area 101. In either case, it may be desirable to automatically extend the path along which the machine 10 travels.

Figure 5:
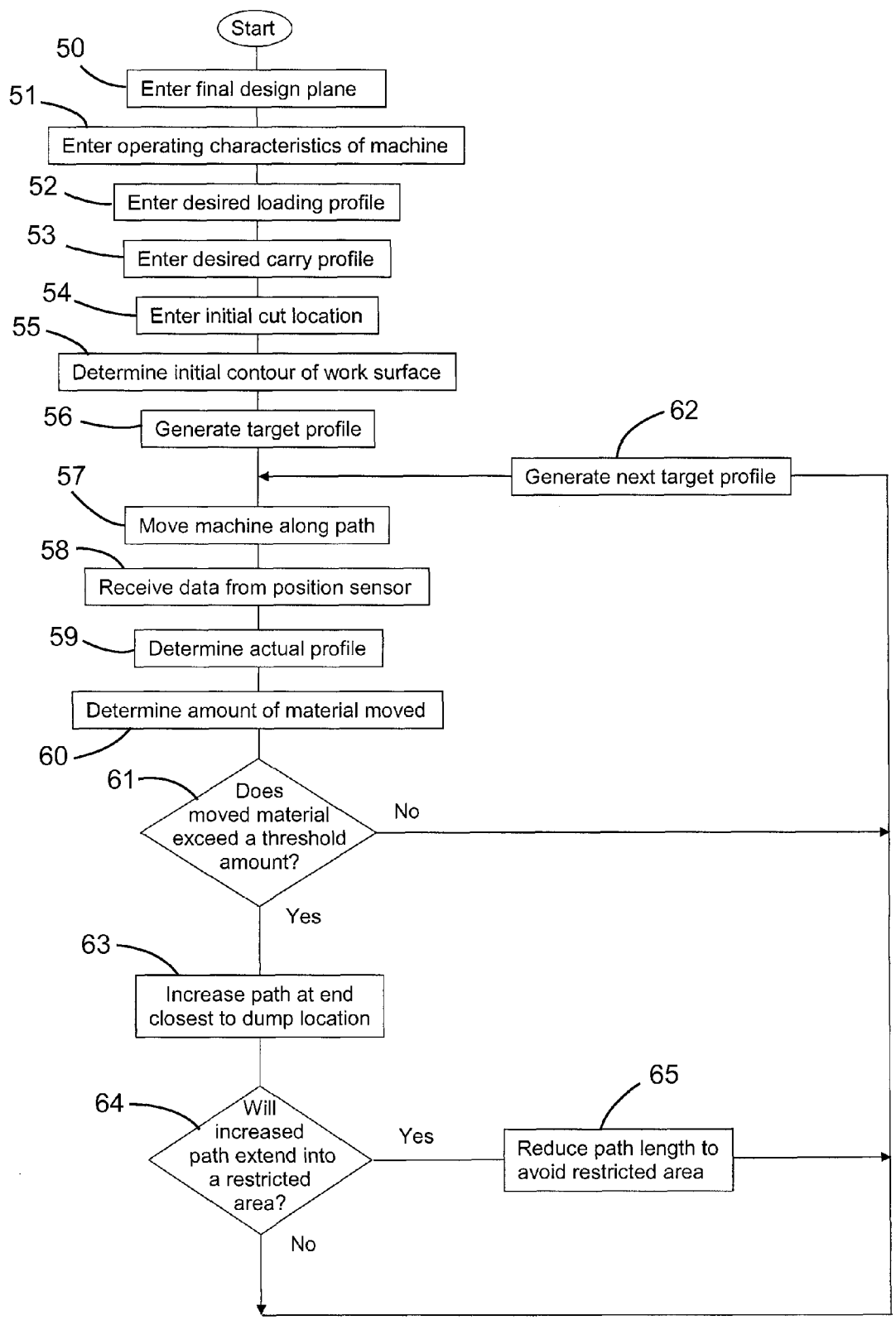
FIG. 5 shows a flowchart illustrating a path of operation adjustment process in accordance with the disclosure.

FIG. 5 depicts such a process in which the planning system 48 may automatically extend the path along which the machine operates or travels. At stage 50, the final design plane 112 may be set within or entered into the controller 31. In one embodiment, the final design plane 112 may be entered by an operator or some other personnel. In another embodiment, the final design plane may be generated by the control system 30.

At stage 51, the operating characteristics of the machine 10 may be entered into controller 31. These operating characteristics may include a desired maximum load on the machine 10 and dimensions of the machine including those of blade 16. In an alternate embodiment, a desired maximum load on the blade 16 may be used rather than the maximum load on the machine 10. The dimensions of blade 16 may be used by controller 31 to determine the volume of material moved by the machine 10.

At stage 52, the desired first portion 121 of the target profile 120 or loading profile may be entered into controller 31. As stated above, the loading profile may have many different configurations. If desired, the loading profile may be broken into a series of segments that may be equal or unequal in length and each segment may have a different shape or identical shapes. The angle of each of the segments may vary from segment to segment if desired.

At stage 53, the carry profile or slot parameters may be entered into controller 31. The carry profile may define the shape of the carry surface 116, the depth of the carry surface 116 below an uppermost surface 124 of the work surface 103, and the carry angle 125 of the carry surface 116 relative to a fixed reference. In FIG. 4, the carry angle 125 is depicted relative to the final design plane 112. An initial cut location 115 may be set or determined at stage 54 and entered into controller 31.

At stage 55, the position or initial contour of the actual profile or work surface 103 may be determined. The configuration of the work surface 103 may be determined by a topographical map of the earth at the work area 101. In an alternate step, the configuration of the work surface 103 may be determined by moving a mapping vehicle along the work surface 103 to establish its configuration. In still another alternate step, the machine 10 may be moved along the work surface 103 and the position sensor 33 may provide a plurality of signals to controller 31 to indicate the position of the machine 10. The controller 31 may determine the position of the machine 10 within the work area 101 as well as the orientation of the machine such as its heading, pitch and roll. Based upon the known dimensions of the machine 10 stored within the controller 31 and the position sensor 33 defining a data or reference point on the machine, the controller 31 may determine the configuration of the work surface 103 over which the machine 10 is traveling.

At stage 56, the controller 31 may utilize any or all of the final design plane 112 entered at stage 50, the operating characteristics of the machine 10 entered at stage 51, the desired loading profile entered at stage 52, the desired slot parameters entered at stage 53, the initial cut location 115 entered at stage 54, and the position or initial contour of the work surface 103 determined at stage 55 to generate a target profile 120.

At stage 57, the machine 10 is moved along the path from the initial location 107 to the dump location 108. While doing so, the controller 31 may move the blade 16 so that it generally follows the target profile 120 to cut or engage the work surface 103 along the cut 114 and move the material 104 generally along the carry surface 116. As the machine 10 moves along the path, the controller 31 may receive at stage 58 data from the position sensor 33. Inasmuch as the position sensor 33 may not be positioned immediately adjacent the work surface 103, the controller 31 may utilize the known dimensions of the machine 10 together with the data from the position sensor 33 to determine at stage 59 the configuration of the actual profile or work surface 103. Other manners of determining the configuration of the actual profile are contemplated.

At stage 60, the controller 31 may determine the amount of material 104 moved by the machine 10. In one embodiment, the amount of material 104 moved may be determined by the controller 31 based on the volume of material moved. In another embodiment, the amount of material moved may be determined based upon the number of material movement cycles of the machine. In other words, the amount of material may be determined based upon the number of times the machine 10 has engaged the work surface 103 and traveled to the dump location. In still other embodiments, it may be possible to determine the amount of material moved based upon the load on the machine 10 or the blade 16 or the depth of the material moved.

The controller 31 may determine at decision stage 61 whether the amount of material 104 moved by the machine 10 has reached or exceeded a predetermined threshold or amount. If the amount of material 104 moved by the machine 10 has not reached the threshold, the machine 10 and controller 31 may continue to operate in a predetermined manner and the next target profile 120 may be generated at stage 62.

If the amount of material 104 moved by the machine 10 has reached the threshold, the controller 31 may, at stage 63, extend the path of the next target profile 120 generally towards the dump location 108 by a predetermined distance or enlargement increment generally towards the dump location 108. In one example the distance may be approximately 0.5 m. Increments of other lengths may be used if desired. In other instances, the distance may be smaller or even zero depending on the operating environment of the machine 10.

The length of the enlargement increment may be based upon the slope of the area to be filled in by material 104, the angle of repose of the material 104 being moved, the environmental conditions in which the machine 10 is being operated, and the timeline of the operation of moving the material.

For example, if the slope of the area being filled in is relatively steep, the controller 31 may be set to utilize a relatively small enlargement increment (or even a zero increment) due to the risks associated with operating the machine 10 near the crest 102. If the material 104 is relatively unstable, such as sand and other similar materials, the enlargement increment may also be relatively small. Still further, the enlargement increment may be set to zero at the beginning of a project and only increased after a certain period of time or a number of material moving cycles have occurred.

At decision stage 64, the controller 31 may determine whether the extended path will extend into a restricted area. For example, the extended path may extend too close to the crest 102, may extend into an area in which other machines or personnel are operating, or may extend into an area in which material is not desired. If the extended path will extend into a restricted area, the controller 31 may modify the extended path at stage 65 by reducing it as necessary to avoid the restricted area or maintain the path outside of the restricted area. In some cases, this may include not extending the path at all and in other cases may reduce the enlargement increment. In such case, the controller 31 may generate at stage 62 the next target profile 120 based upon the reduced path length generated at stage 65. If the extended path will not extend into a restricted area at stage 64, the controller 31 may generate at stage 62 the next target profile 120 based upon the extended path.

Figure 6:
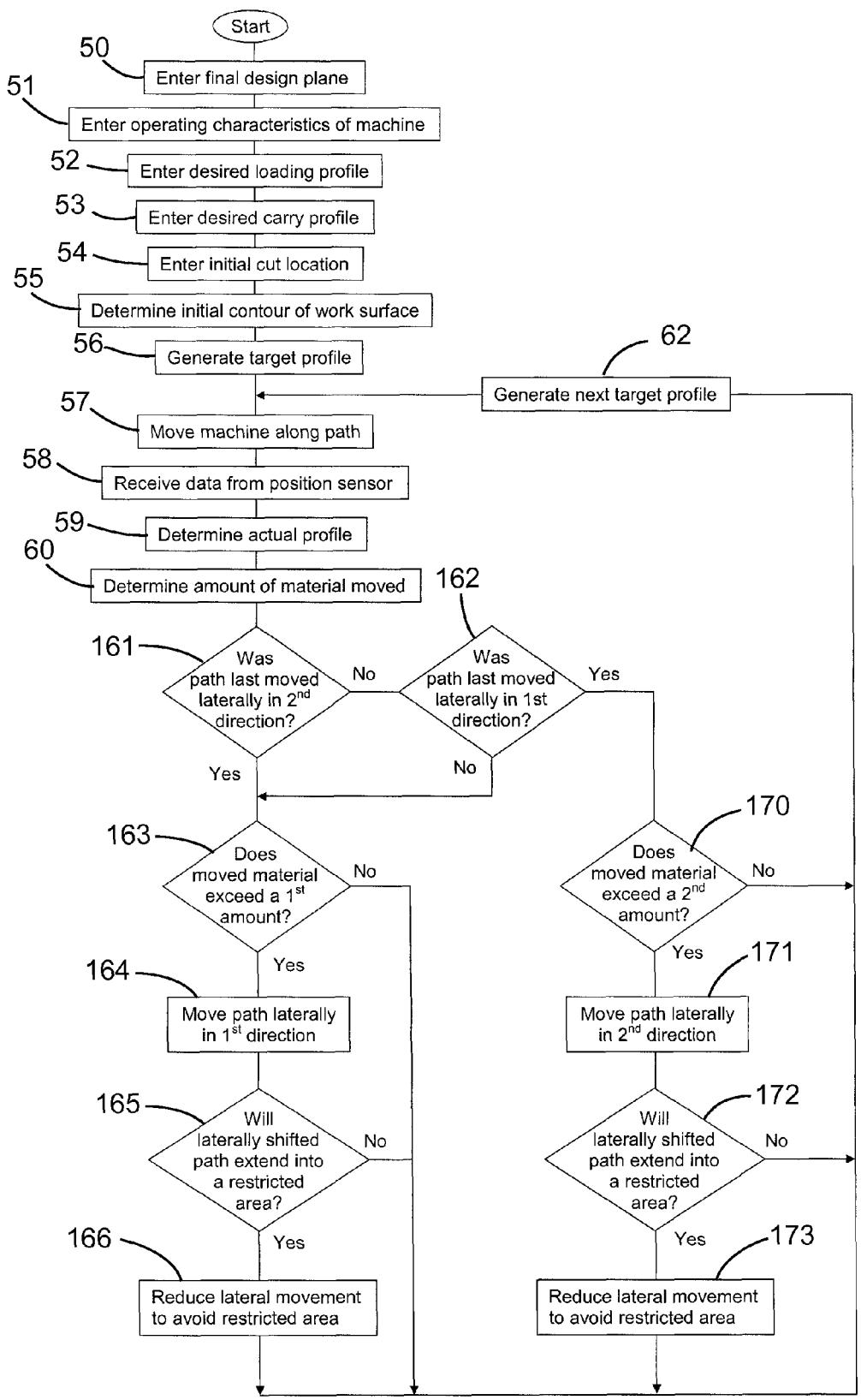
FIG. 6 shows a flowchart illustrating an alternate path of operation adjustment process in accordance with the disclosure.

FIG. 6 depicts another process in which the planning system 48 may be used to automatically adjust or modify parameters used to determine a subsequent path or target profile 120 along which the machine 10 is intended to travel. More specifically, a process is depicted in which the planning system 48 may automatically shift the path of operation laterally to extend or widen the path along which the machine 10 travels.

Figure 7:
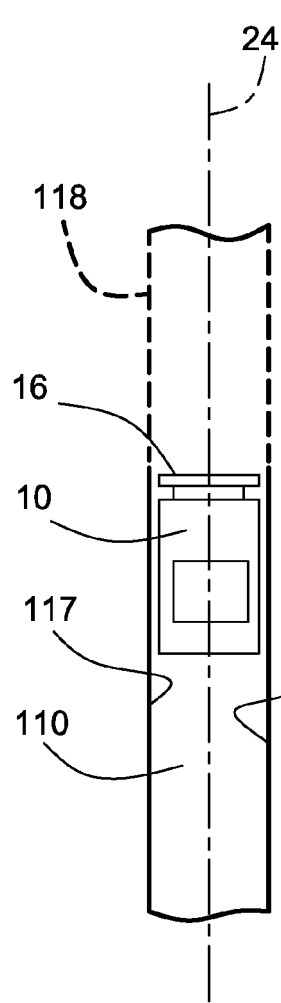
FIG. 7 shows a schematic top view of a machine engaging a work surface in accordance with the disclosure.

Referring to FIG. 7, the blade 16 of machine 10 initially engages the work surface 103 at cut location 115 and moves the material from an initial location 107 towards a dump location 108. In doing so, as described above, the blade 16 forms or cuts a slot 110 into the work surface 103. The portion of the slot 110 not yet cut by machine 10 is depicted by a dashed line 118. The slot 110 is centered along the centerline 24 of the machine 10 and the width of the slot 110 formed by the blade 16 will generally be equal to the width of the blade. However, in some situations it may be desirable to create a slot 110 that is wider than the width of the blade 16. Slightly widening the slot 110 may increase the maneuverability of the machine 10 within the slot. For example, it may be difficult for a machine 10 to move along the path of operation within a slot 110 that closely matches the width of the blade 16. This may be particularly true when machine 10 is being operated autonomously or semi-autonomously, or even if the machine is being operated by remote control. Still further, in instances in which the slot 110 is relatively deep and is not wide enough, vibrations from the machine 10 or other sources or engagement by the machine 10 may cause the sidewalls 117 to collapse into the slot.

Figure 8:
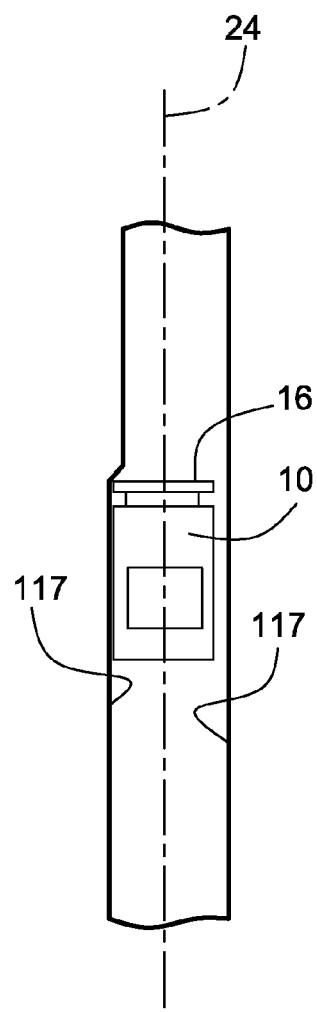
FIG. 8 shows a schematic top view similar to FIG. 7 but with the path of operation of the machine shifted to the left.

In FIG. 8, the path of operation of the machine 10 has been moved or shifted laterally in a first direction (to the left in FIG. 8) generally perpendicular to the path of operation so that the blade 16 not only engages the work surface 103 along the bottom of the slot 110 but also engages the sidewall 117 along one side (the left in FIG. 8). As a result, movement of the machine 10 along the path of operation not only increases the depth of the slot 110 but also widens the slot along one of its side.

Figure 9:
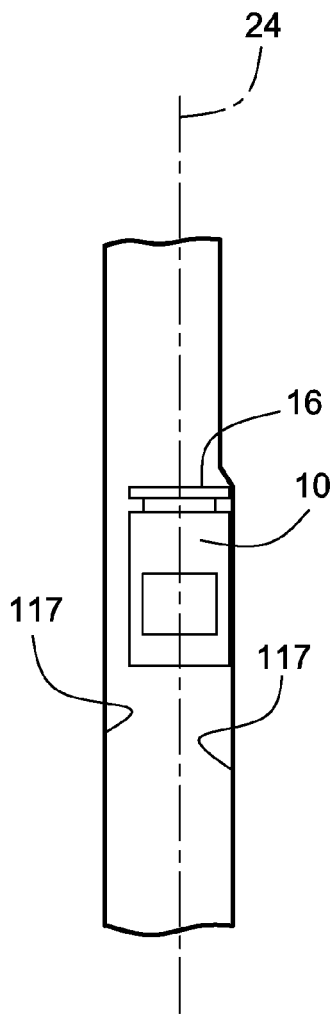
FIG. 9 shows a schematic top view similar to FIG. 7 but with the path of operation of the machine shifted to the right.

In FIG. 9, the path of operation of the machine 10 has been moved or shifted laterally in a second direction opposite the first direction (to the right in FIG. 9) so that the blade 16 not only engages the work surface 103 along the bottom of the slot 110 but also engages the sidewall 117 along the opposite side (the right in FIG. 9). In doing so, the path of operation of the machine was shifted in the first direction by a first distance and then shifted in the second direction by a second distance. If the path of operation is being shifted so as to engage and enlarge the second sidewall 117, the second distance will be greater than the first distance. Through such movement of the machine 10 along the path of operation, the depth and width of the slot 110 may be increased.

Referring back to FIG. 6, stages 50-60 are identical to those of FIG. 5 and the descriptions thereof are not repeated. At decision stage 161, the controller 31 may determine whether the path of the machine 10 was last moved laterally in the second direction. If the path was not last moved laterally in the second direction, the controller 31 may determine at decision stage 162 whether the path of the machine 10 was last moved laterally in the first direction. If the path was not last moved laterally in the first direction, the machine 10 has not yet been moved laterally in either direction and the machine 10 is moving in slot 110 that may be generally equal to the width of the blade 16 as depicted in FIG. 7.

The controller 31 may determine at decision stage 163 whether the amount of material 104 moved by the machine 10 has reached or exceeded a first predetermined threshold or amount. If the amount of material 104 moved by the machine 10 has not reached the first threshold, the machine 10 and controller 31 may continue to operate in a predetermined manner and the next target profile 120 may be generated at stage 62.

If the amount of material 104 moved by the machine 10 has reached the first threshold, the controller 31 may, at stage 164, move the path of the machine laterally in the first direction which will ultimately move the next target profile 120 laterally in the first direction. The path may be moved by a predetermined distance or enlargement increment. The size of the enlargement increment may be based upon the slope of the area to be filled in by material 104, the angle of repose of the material 104 being moved, the environmental conditions in which the machine 10 is being operated, as well as other operating factors and conditions.

At decision stage 165, the controller 31 may determine whether the laterally moved path will extend into a restricted area. If the laterally moved path will extend into a restricted area, the controller 31 may modify the laterally moved path at stage 167 by reducing it as necessary to avoid the restricted area or maintain the path outside of the restricted area. In some cases, this may include not extending the path at all and in other cases may reduce the size of the enlargement increment. In such case, the controller 31 may generate at stage 62 the next target profile 120 based upon the modified path generated at stage 167.

If the laterally moved path will not extend into a restricted area at stage 165, the controller 31 may generate at stage 62 the next target profile 120 based upon the laterally moved path. Movement of the machine 10 along the next target profile 120 will cause the blade 16 to engage the left-hand sidewall 117 of the slot 110 as depicted in FIG. 8.

If the path was not last moved laterally in the first direction at decision stage 162, the controller 31 may determine at decision stage 170 whether the amount of material 104 moved by the machine 10 has reached or exceeded a second predetermined threshold or amount. If the amount of material 104 moved by the machine 10 has not reached the second threshold, the machine 10 and controller 31 may continue to operate in a predetermined manner and the next target profile 120 may be generated at stage 62.

If the amount of material 104 moved by the machine 10 has reached the second threshold, the controller 31 may, at stage 171, move the path of the machine laterally in the second direction which will ultimately move the next target profile 120 laterally in the second direction. The path may be moved by a predetermined distance or enlargement increment. The size of the enlargement increment may be based upon the slope of the area to be filled in by material 104, the angle of repose of the material 104 being moved, the environmental conditions in which the machine 10 is being operated, as well as other operating factors and conditions.

At decision stage 172, the controller 31 may determine whether the laterally moved path will extend into a restricted area. If the laterally moved path will extend into a restricted area, the controller 31 may modify the laterally moved path at stage 173 by reducing it as necessary to avoid the restricted area or maintain the path outside of the restricted area. In some cases, this may include not extending the path at all and in other cases may reduce the size of the enlargement increment. In such case, the controller 31 may generate at stage 62 the next target profile 120 based upon the modified path generated at stage 173.

If the laterally moved path will not extend into a restricted area at stage 172, the controller 31 may generate at stage 62 the next target profile 120 based upon the laterally moved path. Movement of the machine 10 along the next target profile 120 will cause the blade 16 to engage the right-hand sidewall 117 of the slot 110 as depicted in FIG. 9.

Once the machine 10 has been moved laterally to create the desired width of slot 110, the controller 31 may continue to evaluate the amount of material moved by the blade 16. By resetting the determination of the amount of material being moved, the controller 31 may move the machine 10 in an alternating manner between the left-hand and right-hand sidewalls 117 to maintain the desired width of slot 110. More specifically, if the path was last moved laterally in the first direction at decision stage 162, the machine 10 may be positioned as depicted in FIG. 8 adjacent the left-hand sidewall 117. In such case, once the amount of material moved exceeds the second predetermined amount, the process of stages 170-137 may be repeated so that the machine 10 may be moved laterally in the first direction a sufficient distance so that the edge of the blade 16 is positioned along the right-hand sidewall 117. If the path was last moved laterally in the second direction at decision stage 161, the machine 10 may be positioned as depicted in FIG. 9 adjacent the right-hand sidewall 117. In such case, the process of stages 163-167 may be repeated so that the machine 10 may be moved laterally in the first direction a sufficient distance so that the edge of the blade 16 is positioned along the left-hand sidewall 117.

Other manners of altering the path of travel of the machine 10 are contemplated. For example, the path of operation of the machine 10 may be laterally shifted so as to only laterally enlarge the slot 110 along one sidewall 117. Still further, the machine may also be directed to alternate its travel along each of the sidewalls 117 and also along the center of slot 110 if desired.

Figure 10:
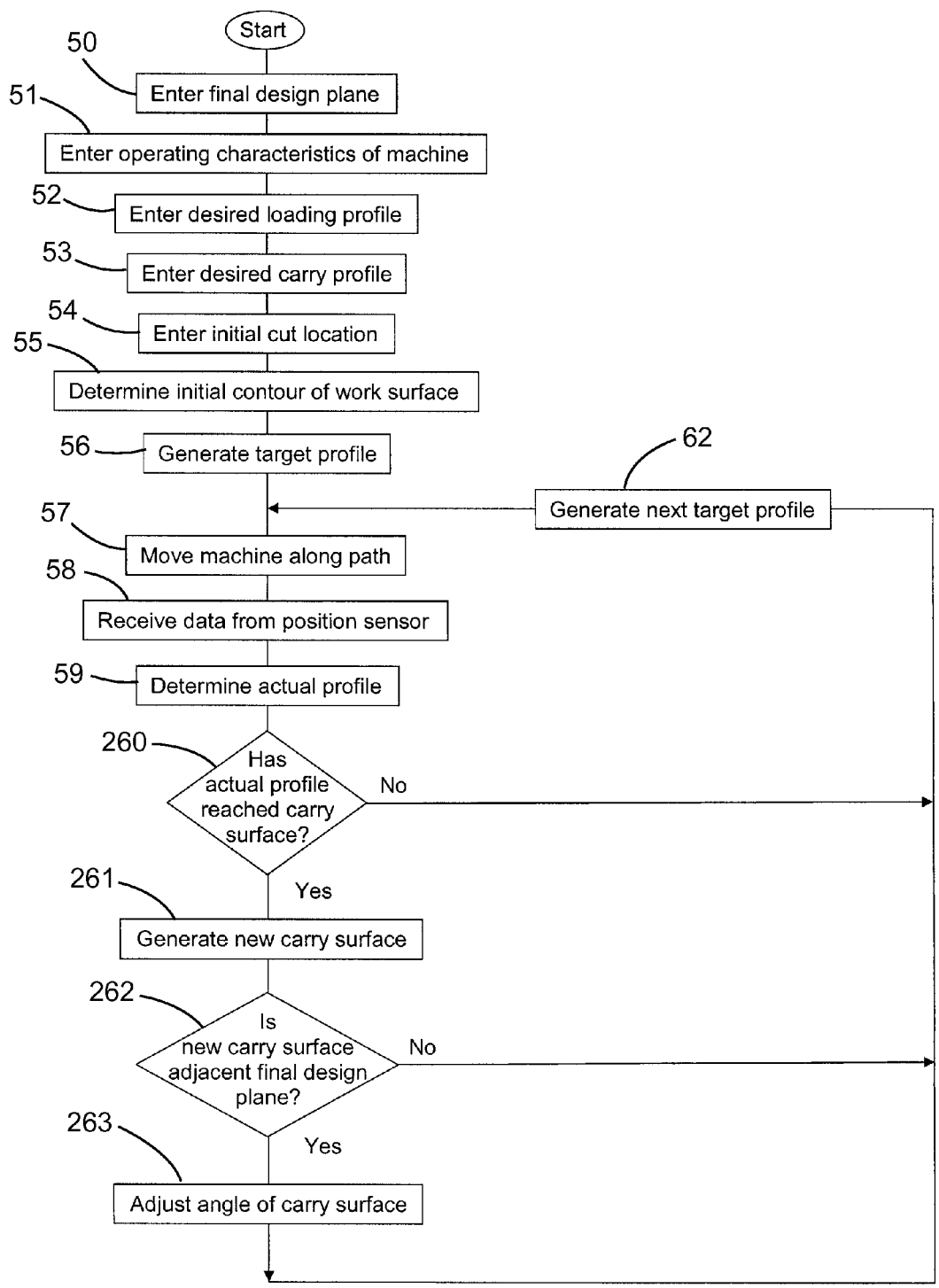
FIG. 10 shows a flowchart illustrating another alternate path of operation adjustment process in accordance with the disclosure.

FIG. 10 depicts still another process in which the planning system 48 may be used to automatically adjust or modify parameters used to determine a subsequent path or target profile 120 along which the machine 10 is intended to travel. More specifically, a process is depicted in which the planning system 48 may automatically shift or adjust the angle of at least a portion of the path of operation such as the carry surface 116 of the target profile 120 relative to a gravity reference.

As may be seen in FIG. 4, the carry surface 116 may intersect with the final design plane 112. In such case, the controller 31 may be configured to guide the blade 16 along the carry surface 116 until reaching the final design plane 112. At that time, the blade 16 may be guided along the final design plane 112. With such a process, the blade 16 may be controlled to remain above the final design plane 112 even though the carry surface 116 directed the blade below the final design plane. However, operating in this manner may reduce the efficiency of the material moving process. Accordingly, it may be desirable to adjust the carry angle 125 of the carry surface 116 before the carry surface intersects with the final design plane 112. As set forth below, shifting or the angular rotation of the carry surface 116 may be performed one or more times to gradually reduce the carry angle 125 between the final design plane 112 and the carry surface 116.

Figure 11:
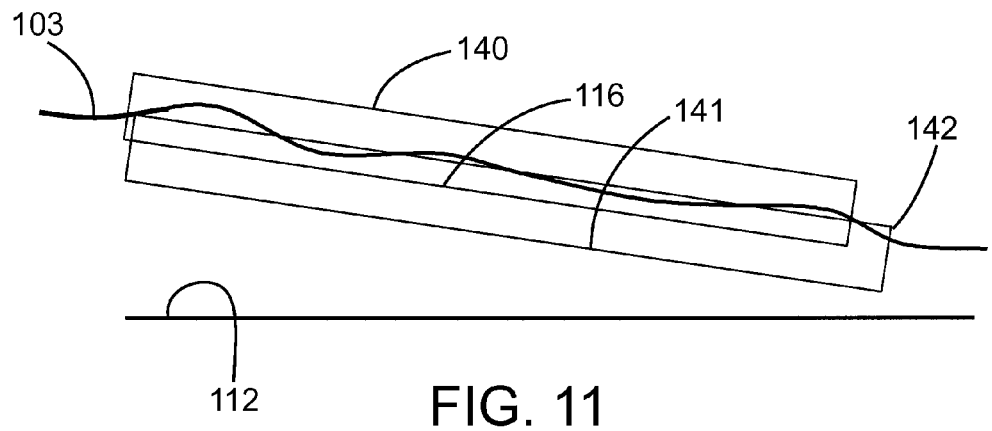
FIG. 11 shows a diagrammatic cross-section of a portion of a work site depicting a pair of sequential slot parameters.

Referring to FIG. 11, the slot parameters (i.e., the depth of the depth of the carry surface 116 below an uppermost surface of the work surface 103 and the carry angle 125 of the carry surface relative to the final design plane 112) are depicted as a first rectangle 140. After all of the cuts have been made in work surface 103 along the carry surface 116, a new carry surface 141 may be generated by the planning system 48. The slot parameters of the new carry surface 141 are depicted as a second rectangle 142. Second rectangle 142 may be seen as being below the first rectangle 140 to reflect the lowered new or carry surface 141 and extends further towards the dump location 108.

Figure 12:
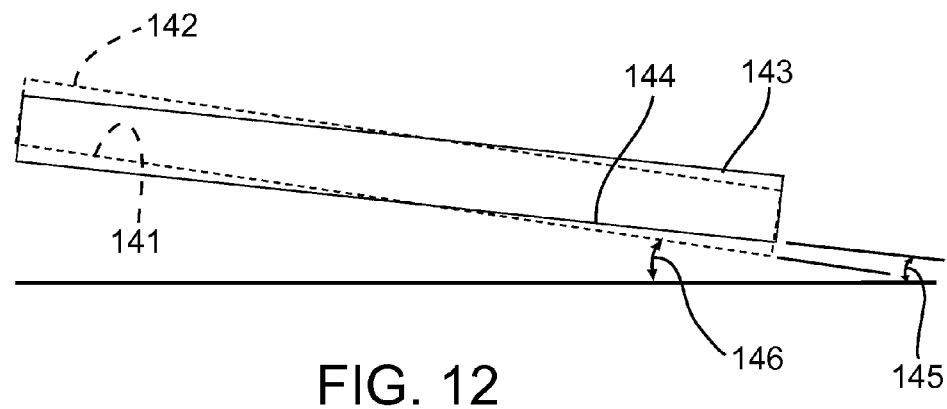
FIG. 12 shows a diagrammatic cross-section of a portion of a work site with one of the slot parameters of FIG. 11 in its original position and in a rotated position.

In FIG. 12, the second rectangle 142 depicting the slot parameters of the new carry surface 141 is depicted in dashed lines. The solid rectangle 143 reflects the rotated new carry surface 144 that has been rotated so that the angle 145 between the final design plane 112 and the rotated new carry surface 144 is reduced. In other words, the angle 145 between the final design plane 112 and the rotated new carry surface 144 is less than the angle 146 between the final design plane 112 and the new carry surface 141.

Figure 13:
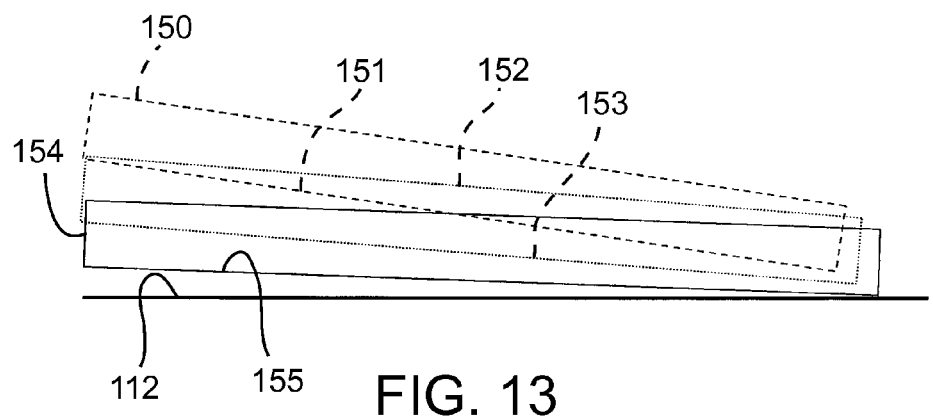
FIG. 13 shows a diagrammatic cross-section of a portion of a work site depicting a sequence of slot parameters corresponding to a reduction in carry angles.

FIG. 13 depicts a plurality of rectangles indicative of the slot parameters of a plurality of sequential carry surfaces. The upper rectangle 150 includes an upper carry surface 151 along which the blade 16 moves first. After all of the cuts associated with the upper carry surface 151 have been made, the controller 31 shifts the generation of subsequent target profiles 120 to the slot parameters reflected by the middle rectangle 152. The middle rectangle generally reflects middle carry surface 153. After all of the cuts associated with the middle carry surface 153 have been made, the controller 31 shifts the generation of subsequent target profiles 120 to the slot parameters reflected by the lower rectangle 154. The lower rectangle generally reflects lower carry surface 155. In some instances, gradually reducing the carry angle 125 between each carry surface and the final design plane 112 may increase the efficiency of the material moving process.

Referring back to FIG. 10, stages 50-59 are identical to those of FIG. 5 and the descriptions thereof are not repeated. At decision stage 260, the controller 31 may determine whether the actual profile or work surface 103 has reached the carry surface 116. In other words, the controller 31 may determine whether any additional cuts may be made in an efficient manner while using the carry surface 116 or whether the controller should switch to the next carry surface closer to the final design plane 112. If the actual profile has not reached the carry surface 116, the machine 10 and controller 31 may continue to operate in a predetermined manner and the next target profile 120 may be generated at stage 62.

If the actual profile has reached the carry surface 116, the controller 31 may generate at stage 261 a new carry surface 116. The controller 31 may determine at decision stage 262 whether the new carry surface 116 is adjacent the final design plane 112. If the new carry surface 116 is within a predetermined distance of the final design plane 112, the controller 31 may adjust or modify the carry angle 125 of the carry surface 116 to define a modified carry angle. The next target profile 120 may be generated at stage 62 based at least in part on the final design plane 112, the actual profile of the work surface 103, and the modified carry angle. If the new carry surface 116 is not within a predetermined distance of the final design plane 112, the controller 31 may use the new carry surface 116 and the next target profile 120 may be generated at stage 62.

INDUSTRIAL APPLICABILITY

The industrial applicability of the control system 30 described herein will be readily appreciated from the foregoing discussion. The foregoing discussion is applicable to machines 10 that move material at a work site 100 such as a mining site, a landfill, a quarry, a construction site, or any other area in which movement of material is desired. Machine 10 may include a planning system 48 that utilizes certain parameters to determine an target profile 120 along which a work implement of the machine may be directed to move. A system may also determine an amount of material moved by the work implement of the machine. After a predetermined amount of material has been moved, the planning system 48 may automatically adjust or modify some of the parameters used to determine subsequent target profiles.

The parameters to be modified by the planning system 48 and the amount of material to be moved before modifying the parameters may be set by an operator, management of a site, or other personnel as desired. Modifying the parameters used to determine the target profiles 120 may permit the machine to operate more efficiently.

As machine 10 moves, the controller 31 may monitor various systems and operating conditions of the machine. The controller 31 may compare a target profile 120 along which the blade 16 was intended to move to an actual profile along which the blade actually moved. By comparing the target profile 120 to the actual profile, the controller 31 may determine whether the material being moved is firmer or softer than that which is expected or had been previously utilized in the planning system 48. The controller 31 may modify the characteristics of the material utilized by the planning system 48 to alter the operation of the planning system 48. By increasing the accuracy of the material characteristics used by planning system 48, the operation of machine 10 may be increased. The controller 31 may also use the modified material characteristics for other systems if desired.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for controlling operation of a machine having a ground engaging work implement, comprising:
 a position sensor associated with the machine for generating position signals indicative of a position of a work surface; and
 a controller configured to:
  store a final design plane;
  generate a target pass surface;
  generate a path of operation;
  generate a plurality of commands to move the ground engaging work implement along the path of operation;
  receive a plurality of position signals from the position sensor as the work implement moves material along the path of operation;
  determine the position of the work surface based upon the plurality of position signals;
  upon the position of the work surface reaching the target pass surface, utilize a subsequent target pass surface spaced from the target pass surface, the subsequent target pass surface being at an angle relative to the target pass surface and located closer to the final design plane than the target pass surface;
  generate a subsequent path of operation, the subsequent path of operation being based upon the subsequent target pass surface and at least a portion of the subsequent path of operation being at an angle relative to the path of operation; and
  generate a plurality of commands to move the ground engaging work implement along the subsequent path of operation.

2. The system of claim 1, wherein the controller is configured to generate the subsequent target pass surface by extending the subsequent target pass surface generally towards a dump location farther than the target pass surface.

3. The system of claim 1, wherein the controller is further configured to generate the subsequent target pass surface by extending an end of the subsequent target pass surface generally adjacent a dump location and farther than the target pass surface.

4. The system of claim 1, wherein the controller is further configured to generate the target pass surface based at least in part upon conditions of an operating environment of the machine.

5. The system of claim 4, wherein the operating environment includes at least one of an angle of repose of material being moved and an angle of the target pass surface relative to a gravity reference.

6. The system of claim 1, wherein the target pass surface is generally linear.

7. The system of claim 1, wherein the controller is further configured to:

store a desired carry profile including a carry angle of a portion of the path of operation relative to a gravity reference;

store a final design plane of the work surface;

modify the carry angle if an actual profile is within a predetermined distance of the final design plane to define a modified carry angle; and determine a target profile extending along the path of operation, the target profile based at least in part upon the final design plane, the actual profile of the work surface, and the modified carry angle.

8. A system for controlling operation of a machine having a ground engaging work implement, comprising:

a position sensor associated with the machine for generating position signals indicative of a position of a work surface; and a controller configured to:

store a final design plane;

generate a target pass surface, a first intermediate target pass surface, and a second intermediate target pass surface, the target pass surface being closer to the final design plane than the second intermediate target pass surface, and the second intermediate target pass surface being closer to the final design plane than the first intermediate target pass surface;

generate a path of operation;

generate a plurality of commands to move the ground engaging work implement along the path of operation to create a slot;

receive a plurality of position signals from the position sensor as the work implement moves material along the path of operation;

determine the position of the work surface based upon the plurality of position signals;

generate a first subsequent path of operation, the first subsequent path of operation being shifted laterally in a first direction generally perpendicular to the path of operation and towards the target pass surface;

upon the position of the work surface reaching the first intermediate target pass surface, generate a plurality of first subsequent commands to move the ground engaging work implement along the first subsequent path of operation to increase a width and a depth of the slot;

generate a second subsequent path of operation, the second subsequent path of operation being shifted relative to the first subsequent path of operation laterally in a second direction generally opposite the first direction and towards the target pass surface; and upon the position of the work surface reaching the second intermediate target pass surface, generate a plurality of second subsequent commands to move the ground engaging work implement along the second subsequent path of operation to increase the width and the depth of the slot.

9. The system of claim 8, wherein the controller is further configured to shift the first subsequent path of operation laterally in the first direction by a first distance and shift the second subsequent path of operation laterally in the second direction by a second distance, the second distance being greater than the first distance.

10. A controller implemented method for controlling operation of a machine, comprising:

storing a final design plane;

generating a target pass surface;

generating a path of operation;

generating a plurality of commands to move the ground engaging work implement along the path of operation;

receiving a plurality of position signals from a position sensor indicative of a position of a work surface as a work implement of the machine moves material along the path of operation;

determining the position of the work surface based upon the plurality of position signals;

upon the position of the work surface reaching the target pass surface, utilizing a subsequent target pass surface spaced from the target pass surface, the subsequent target pass surface being rotated at an angle relative to the target pass surface and located closer to the final design plane than the target pass surface;

generating a subsequent path of operation, the subsequent path of operation being based upon the subsequent target pass surface and at least a portion of the subsequent path of operation being at an angle relative to the path of operation; and generating plurality of commands move the ground engaging work implement along the subsequent path of operation.

11. The method of claim 10, further including generating the subsequent target pass surface by extending the subsequent target pass surface generally towards a dump location farther than the target pass surface.

* * * * *